United States Patent [19]

Johnson

[11] 4,087,175
[45] May 2, 1978

[54] AUTOMATIC MICROFILM CAMERA OPERATED RESPONSIVE TO DATA INPUT AT A COMPUTER TERMINAL

[75] Inventor: Delmar R. Johnson, Barrington, Ill.

[73] Assignee: Bell & Howell Company, Chicago, Ill.

[21] Appl. No.: 769,373

[22] Filed: Feb. 16, 1977

[51] Int. Cl.² .................. G03B 27/52; G03B 27/32
[52] U.S. Cl. ........................................ 355/40; 355/64; 355/77
[58] Field of Search ................ 355/20, 39, 77, 40, 355/75, 74, 64, 18, 54

[56] References Cited

U.S. PATENT DOCUMENTS

| | | | |
|---|---|---|---|
| 3,240,114 | 3/1966 | Jonker et al. | 355/20 |
| 3,241,434 | 3/1966 | Lee et al. | 355/54 X |
| 3,334,539 | 8/1967 | Kleist et al. | 355/64 X |
| 3,536,395 | 10/1970 | Terry et al. | 355/64 X |
| 3,669,539 | 6/1972 | Okuyama | 355/64 |
| 3,750,553 | 8/1973 | Pfeifer et al. | 355/40 X |
| 3,872,462 | 3/1975 | Lemelson | 355/18 UX |
| 3,910,698 | 10/1975 | Sone et al. | 355/75 X |
| 3,981,582 | 9/1976 | Bookless | 355/75 X |

Primary Examiner—Donald Griffin
Attorney, Agent, or Firm—Alan B. Samlan

[57] ABSTRACT

An automatic microfilm camera is positioned to take images of a document while it is being read by an operator of a computer terminal. The computer generates a computer index number, and perhaps other significant information, which is forwarded via an interface circuit to display a readout of alpha-numerical images within the photographic area adjacent to the copied document. The camera automatically takes a picture of the document and the display when the operator pushes an "Enter" or other appropriate button on the computer terminal, thereby photocopying both the document and the displayed images. An important aspect of the invention is that the photographic cycle is initiated automatically by an appropriate step in the data entry sequence, whereby the normal data entry procedures are not disturbed by the existance or the use of the camera. An advantage is that the camera and computer are inherently synchronized and cannot lose their mutual sequencing.

20 Claims, 3 Drawing Figures

AUTOMATIC MICROFILM CAMERA OPERATED RESPONSIVE TO DATA INPUT AT A COMPUTER TERMINAL

This invention relates to microfilm cameras and more particularly to cameras especially — although not exclusively — well suited for use in conjunction with a computer data entry terminal.

The processing of many types of business record and transaction documents includes an entry of information into a computer. Frequently such documents are also microfilmed. According to the invention, this data entry step and the microfilm recording step are combined, with the following advantages:

1. Inherently, the computer index (which results from the data entry) and the frame sequence on film are synchronized and hence the computer index is perfect for retrieval.

2. The need for a separate microfilming step is avoided and hence there is a reduction in processing time and labor. With proper hardware design, microfilm recording can almost be performed at no cost.

In the operation of the computer, it is desirable for the information to be filed in such a manner that it may be retrieved at a later date. When microfilm is recorded, it is highly desirable to maintain a filing correlation between the film frame sequence and the data stored in and processed by the computer, so that they may later be coordinated during data retrieval or further processing. Futhermore, if the microfilming and data entry steps can be combined, there is no duplication of document handling and both human and machine errors are reduced.

In many systems, a visual record keeping has been done by microfilming the documents which contain the data fed into the computer. Almost always, there is more data on the document than there is in the data entered into the computer. For example, the computer cannot authenticate a hand-written signature appearing on a document. Therefore, if, for example, a customer argues that he did not sign a purchase order, it becomes necessary to secure the microfilm image of the document itself responsive to the computer generated billing information.

However, this correlation of microfilm framing and data processing has presented a number of problems. If the operator must perform a number of separate document handling steps such as assembling documents, carrying them first to a stand alone microfilm camera or station and then to a computer terminal, copying, etc., it is time-consuming, subject to human and machine errors, feeding errors by the camera and a wasteful duplication of efforts.

Also, it is difficult to insure that the camera and computer will always work in synchronism. It is easy to imagine that data might be fed from a stack of documents into a computer and then the same stack of documents might be placed on an automatic document feeder, to be microfilmed in the same sequence. However, this is difficult to achieve. For example, the documents feeder might double feed so that the computer terminal advances two counts while the film advances one frame. As a result there can be a shift causing a synchronization discrepancy that accumulates as the number of documents in a processing sequence increases. It is irrelevant that the numbers on the film are only slightly off, because the operator still has to personally inspect the film, conduct a visual search for an out-of-place image to find the frame of interest. This is extra difficult because the operator usually does not know which way to turn the reel since it is impossible to know whether the camera counter gained or lost counts.

Accordingly, an object of this invention is to provide new and improved means for and methods of coordinating the operation of a microfilm camera and a computer terminal. Here, an object is to provide such a system which inherently cannot lose synchronism.

Another object of the invention is to provide a common microfilm camera and computer terminal station which may be operated by a single operator, who is primarily concerned with keying data into the computer terminal, and who does not have to interrupt the normal data handling routine in order to microfilm documents. Here, an important object is to make the microfilm camera as unobtrusive as possible. A further object is to locate the photographic plane in a convenient position and height where the document would normally be placed during a data entry function. Therefore, by following natural inclinations, the operator may simply enter data into the computer terminal and the microfilm camera operates automatically and without further human intervention.

Yet another object of the invention is to provide modular microfilm cameras which may be located near existing computer terminals without requiring any other special equipment, such as unique tables, pedstals, or the like.

A still further object of the invention is to provide equipment which may be serviced periodically (as at night, for example) so that the operator does not normally have to devote any attention to loading and unloading film. Here, an object is to enable short strips of exposed film to be conveniently removed from the camera, for immediate processing before the entire reel of undeveloped film is exhausted.

In keeping with an aspect of this invention, these and other objects are accomplished by providing a modular microfilm camera comprising a stand, forming a somewhat tilted surface setting at a natural angle which an operator might select in order to read a document while typing. Suspended over the stand is a microfilm camera which photographs an image of the tilted surface and therefore of a document thereon. Certain alpha-numerical information generated by the computer may be displayed by the camera module, within the photographic area, and thus photographed along with the document. This way every image copied onto microfilm inherently has its own correct label.

A camera designed for this application should be physically and functionally as inconspicuous as possible. The photographic plane should be positioned where the data entry operator normally places the documents for copying. Ambient room lighting should be used for document illumination. The photographic cycle should be automatically controlled from the data entry keyboard. Also, because the data entry step is inherently slow, it is desirable to have a convenient means of removing short lengths of film from the camera.

The nature of a preferred embodiment of the invention will become more apparent from a study of the attached drawings, wherein.

Figure 1:
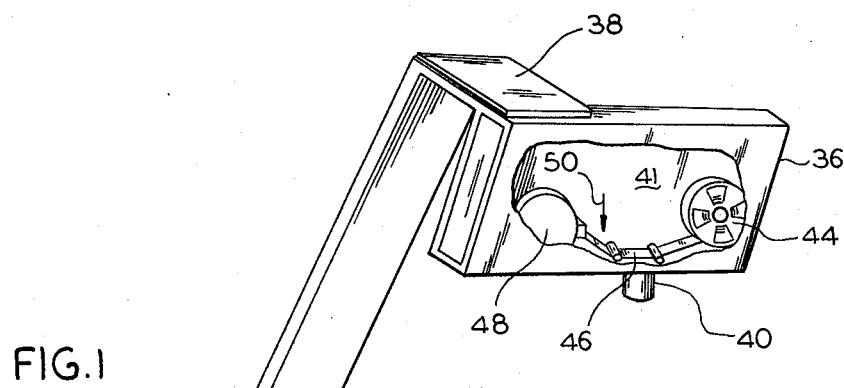
FIG. 1 is a perspective view of a preferred embodiment of the inventive microfilm camera stand, adapted for operation on either the left or right hand sides of the computer terminal.
Figure 1:
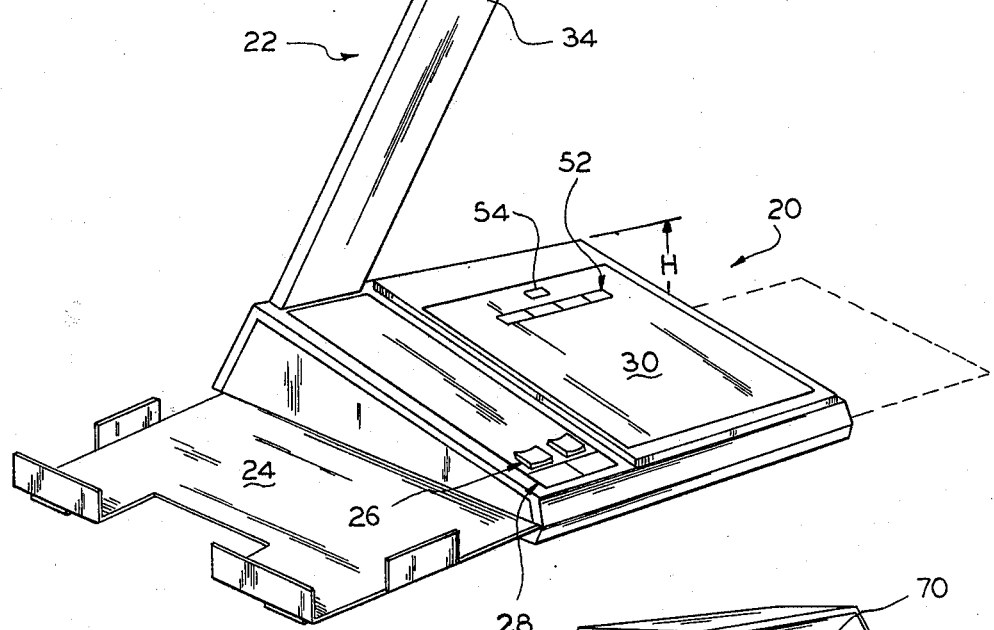

The basic microfilm camera stand is a module best seen in FIG. 1 as including a base stand unit 20, a superstructure 22, and a receiving tray 24. The stand 20 includes a number of manually-operated switches 26 which may turn the camera off or on, advance film, and trip the shutter. If desired, all or a number of these camera controls may be placed under a door so that the operator cannot manually control the camera unless there is a conscious effort to unbar the control panel. Also, any suitable control panel lights 28 may be selectively lit to indicate the operative status of the camera. Any other suitable controls or operational status indicators may also be provided to enable the operator or service personnel to control the camera.

The microfilm camera stand 20 has any suitable height H required to give the operator a comfortable viewing position. For example, a conventional typewriter table has a height of about 26 inches–27 inches while a desk top has a height of 29 inches–30 inches. Therefore, if the camera is resting on a typewriter table, the height H might be about 2 inches greater than it would be if it rested on a near-by desk. At any rate, it is desirable to always position the copyboard so as to produce a document position that allows convenient data entry.

The copyboard 30 of stand 20 has a slant which coincides with a desired reading angle for a person who is typing from a document resting thereon. While the tilt angle of the slanted stand may vary, 10° may be considered an exemplary value. A ledge 32 is formed near the bottom of the slanting copyboard 30. Hence, it should be apparent that a person, who is using the camera, may place one or more documents on the copyboard 30 and read them comfortably, while typing on a nearby keyboard. Microfilm cameras of the contemplated type often have a depth of field in the order of about one-inch. Therefore, for such cameras, a stack of documents up to one inch high may be placed on copyboard 30 and photographed one at a time as they are removed from the stack.

A document receiving tray 24 may be placed on either the left or the right side of the stand 20, according to whether the microfilm camera is on the left or right hand side of the computer terminal 78. The contours of the stand and receiving tray are such that they nest next to each other. They may also be adapted to lock into each other. This way, the operator may place a stack of documents on the copyboard 30 and then slide them, one-at-a-time, onto the receiving tray 24. Hence, there is a minimum amount of work for the operator to move the documents.

The superstructure 22 includes a long, slender, inclined boom 34 extending upwardly from the stand 20 to a horizontal boom 38. A camera 36 is affixed to an end of the horizontal boom 38, which places the camera at the proper distance and in the correct position for photographing the copyboard 30 of stand 20, without keystoning or other image distortion. It is desirable to minimize the bulk of this superstructure not only to minimize light shadow effects on the copyboard but also to minimize visual and physical disturbance to the data entry operator.

The camera 36 includes a conventional lens 40, a film transport 41, and any other parts or equipment for making photographic microimages of the documents on the copyboard 30. The camera housing is broken away in FIG. 1 to show that the film transport system 41 includes a supply reel 44 and a light tight take-up cartridge 48. The film 46 is drawn from the supply reel, across suitable guide rollers and fed into the cartridge 48.

A cutter symbolically shown at 50 is adapted to cut the film 46 near the cartridge 48. This way, a supply of the film may be loaded into the camera. Microfilm images may be taken until a particular file is completed or the end of a work day is reached. At that time, the cutter 50 is operated so that the exposed film in cartridge 48 may be removed for an immediate processing. Another cartridge may then be installed and another length of film may be exposed and removed for immediate processing. This process may be repeated as often as required, until the film supply on reel 44 is exhausted. An alternative is to provide pre-loading, throw-away cartridges, designed to contain both a supply and a take-up section so that the cartridge may simply be dropped into the camera.

The camera contains a slack film detector which indicates when the film supply is exhausted or film drive malfunction. Responsive thereto, the computer terminal keyboard is locked and any other suitable signals may be given, as by lighting a light at 28, for example.

Figure 3:
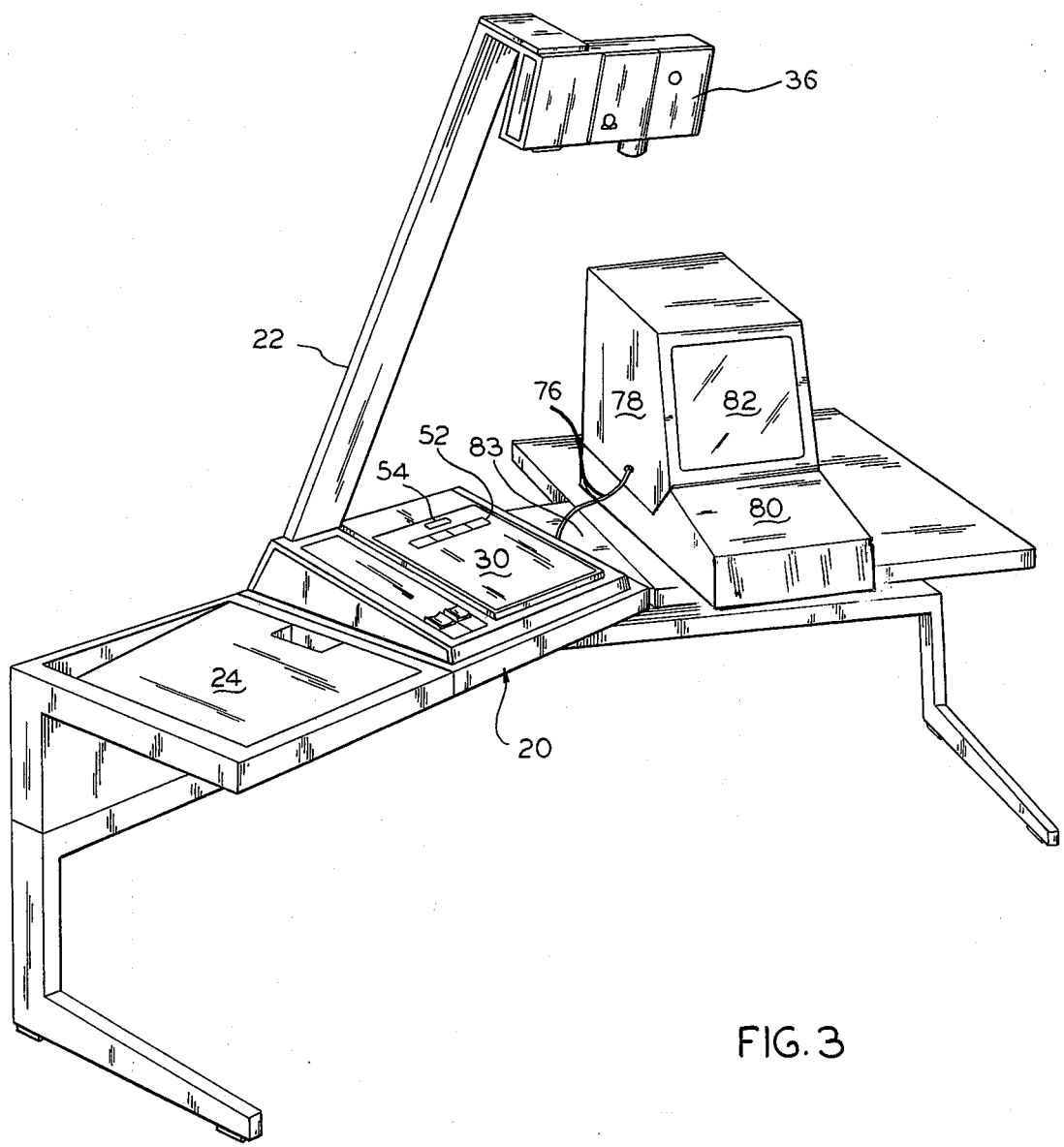
FIG. 3 is a perspective view of the embodiment of FIG. 1, used in conjunction with a computer terminal.

The microfilm camera of FIG. 1 is operated in conjunction with a computer terminal, shown in FIG. 3, preferably on a plug-in basis. A computer controlled from that terminal is adapted to store and process data which is keyed into it from a typewriter-type console. The computer generates additional information according to its prestored program and according to the keyed in data. Responsive thereto, an alpha-numerical device 52 located in the photographed area is operated to display selected information. This device might be an LED readout device somewhat similar to the devices used to display information on currently used electronic calculators. For example, this display could be a simple file number. Or, it could be the name of a company, an invoice number, a date, or a frame number. It might also be a brief summary of accounting data, or the like, which is computed by the computer. The display at 54, also located in the photographed area, may be automatic search information such as blip marks or bar codes which enable a microfilm reader to find and display a selected image.

In any event, when the camera 36 is operated to make a photographic image of a document on copyboard 30, the data displayed at 52, 54 are also copied. This way, each microfilm frame contains its own searching, filing, or other information. Since the readout displayed at 52, 54 is derived from the computer, there is inherently a direct and accurate correlation between information stored in the computer and the document being processed. This is different from a simple counter positioned next to the document. With such a counter, a loss of synchronism with the computer can occur.

The embodiment of FIG. 1 is presently considered to be the best, most desirable, and therefore preferred. Another embodiment is shown in FIG. 2.

Here, the base stand 60 is substantially the same as stand 20 in FIG. 1. Documents are stacked on copyboard 62, alpha-numerical information is displayed at 64, and automatic searching blip marks or bar codes are displayed at 66.

Figure 2:
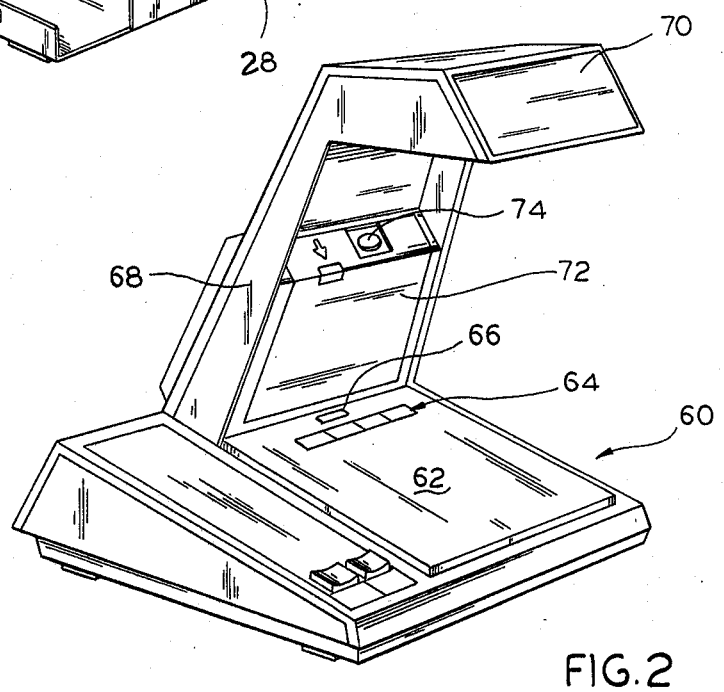
FIG. 2 is a perspective view of an alternative embodiment of a microfilm camera stand with a somewhat more compact superstructure.

The compact superstructure in FIG. 2 includes an upwardly extending boom 68, terminated at the upper end by one or more mirrors enclosed within a housing 70. A camera 72 is enclosed within and near the base of the boom 68, with its lens 74 focused on the mirror system. This way there is a folded light path extending from the document on copyboard 62, to the mirror or mirrors in housing 70, and then to lens 74.

The camera 36 of FIG. 1 is designed to take pictures in the ambient light which is normally found in most modern office areas. This is consistent with the basic philosophy of the system that the data entry functions should not be disturbed by the presence of the microfilm camera. Such a disturbance might occur if special lighting should distract the operator. However, either of the embodiments may have lights added thereto in order to improve the document lighting. The embodiment of FIG. 2 is especially well suited to having light sources built into the housing 70, if desired.

FIG. 3 shows an exemplary installation of the inventive microfilm camera of FIG. 1, for use in conjunction with a computer terminal. The camera of FIG. 3 and its parts may be identified and fully understood by comparing its reference numerals with those used in FIG. 1 and by reading the above explanation.

The camera 36 is connected via a cable 76 to a computer terminal 78. This terminal has a typewriter-like keyboard 80 which may be operated to key any suitable data into a computer (not shown) in FIG. 3. The data is displayed on cathode ray tube 82. The operator watches the displayed data as she types, and makes any desirable corrections, in a known manner. The computer terminal 78 may be located at any convenient position, such as immediately adjacent the copyboard. The drawing shows a small space in this area primarily so that the cable 76 may be seen.

Of course, the inventive microfilm camera may be used with any suitable systems or components such as printers, punch machines, automatic typewriters, or any other suitable device. Therefore, the term "computer terminal" is to be construed in a broad and generic manner, to cover all comparable office machines or the like.

The operator obtains the data that is keyed into the computer by reading copy from a document resting on copyboard 30. Since the microfilm camera is a free-standing module, the operator may slide it to any position which is convenient to a person who is working at the keyboard 80. Responsive to the information keyed in by the operator, the computer selects pertinent data, according to its program, for identifying or supplementing the individually associated document. Then, the computer sends suitable signals over cable 76 to cause a display of that data at the alpha-numerical readouts 52 and 54.

After being satisfied that the data displayed at 82 on the cathode ray tube is accurate, the operator pushes an "Enter" or other suitable button on keyboard 80. The computer accepts the data and processes it in any suitable manner. Substantially simultaneously therewith, a signal is sent over cable 76 to actuate the microfilm camera 36. It takes a picture of the uppermost document then resting on the copyboard 30, together with the data displayed at 52, 54. The film automatically advances after each exposure.

It is not important whether the camera operates after any given data entry function, such as an operation of the "Enter", or any other key. In fact, the computer program may be arranged to take the picture at any time in its sequence and without regard to a particular key operation. The important feature is that a microfilm image should be made at some appropriate time when data is entered from the document then being photographed. Therefore, references herein to operation of the camera during the entry of data is intended to cover all possible entries and is not intended to refer specifically to either the operator keying functions or the programmed computer terminal functions.

In a preferred embodiment, all of this camera operation occurs in a small fraction of a second after the operator pushes the "Enter" or other appropriate key. The operator's instructions are to keep both hands on the keyboard at the time when the "Enter" or other appropriate key is pushed. Therefore, regardless of how quickly the operator moves, it is almost impossible to blur the photographic image by moving a document too soon.

After the "Enter" or other appropriate key is pushed, the operator lifts the top document off the stack of documents resting on copyboard 30, and moves it onto receiving tray 24. This exposes to view the next document in the stack. The operator then proceeds to key in the next information by reading from that next document.

It should now be apparent that the operator is given a convenient stand (copyboard 30) to support the documents that are read, while the typing occurs. The operator does have the job of turning on the camera and, perhaps, of loading and unloading film. In many installations, a service person might load or unload the camera at night or another appropriate time. Beyond this, the operator may totally ignore the camera, at all times. The camera functions by itself without any control from the operator, except indirectly when data is keyed in or an "Enter" or other appropriate key is actuated. In this sense, the task of making microfilm images can be accomplished with virtually no added labor.

Those who are skilled in the art will readily perceive how to modify the system. Therefore, the appended claims are to be construed to cover all equivalent structures.

I claim:

1. A process for recording data in a work station comprising a computer terminal, a document stand, and a camera focused on the document stand, the inventive process comprising the steps of:

(a) entering data in said computer terminal responsive to information read from a document while said document is resting on said stand, (b) displaying identifying information coordinated with the entered data, said information display being located near said document as it rests on said stand and being displayed responsive to the step (a) act of entering said data into said computer terminal, (c) taking a picture containing both said document and said coordinated information display, and (d) locating said document stand at a position convenient to an operator who is entering said data in said computer terminal, whereby said document and coordinated information display are photographed without disturbing the data entry function.

2. The process of claim 1 wherein there is a microfilm camera continuously trained on said document and the added step of selectively removing a short length of exposed film from said camera after a completion of the microfilming of a batch of documents, whereby an entire roll of film does not have to be exposed before exposed film is processed.

3. The process of claim 2 and the added step of correlating the position of information photographed on said film, and the displayed information in said computer.

4. The process of claim 3 wherein step (c) occurs in ambient light.

5. The process of claim 3 and the added step of lighting said document at least during step (c).

6. The process of claim 3 and the added step of initiating step (c) resonsive to a predetermined step in the data entry function of step (a).

7. The process of claim 1 wherein step (c) occurs in ambient light.

8. The process of claim 1 and the added step of lighting said document at least during step (c).

9. The process of claim 1 and the added step of initiating step (c) responsive to a predetermined step in the data entry function of step (a).

10. A microfilm camera configured to photograph a document while it is being read by an operator who is then entering data taken from that document into a computer terminal; said camera comprising means for supporting said document in a position which is convenient for said operator to read while operating said computer terminal during the data entry function; means for connecting said camera to said computer terminal; means responsive to the data being entered into said computer terminal for displaying information on said supporting means, adjacent said document, and within an area photographed by said camera, said displayed information coordinating an identification of said document and of data then being entered in said computer terminal; and means responsive to signals received at said connecting means during data entry for initiating a sequence to photograph both said document and said displayed information while said document is on said supporting means, whereby said documents may be photographed with said coordinating information and without disturbing the data entry function.

11. The camera of claim 10 and means for transporting a supply of film through said camera, and means for extracting from said transport means lengths of said film which are less than the full length of said supply whereby exposed film may be removed from the camera before the entire supply of film is exhausted.

12. The camera of claim 10 and said connecting means comprises means for making plug and jack connections between the computer terminal and the microfilm camera.

13. The camera of claim 10 wherein said coordinated display information includes at least a frame number which is stored both in said computer and on said microfilm.

14. The camera of claim 10 wherein said computer assigns automatic film frame searching marks for recording on said film.

15. The camera of claim 10 wherein said document is lit by ambient light when said document is photographed.

16. The camera of claim 10 and means on said camera for lighting said document while it is being photographed.

17. The camera of claim 10 and means whereby said computer automatically issues said signals received at said connecting means at a predetermined step in the data entry sequence.

18. The camera of claim 10 and means responsive to the entry of data into said computer terminal for automatically operating said camera via said connecting means to make a microfilm image at a predetermined step during the data entry sequence.

19. The camera of claim 10 and means for transporting a supply of film through said camera, means for detecting an exhaustion of a supply of said film, and means responsive to said detection of said exhausted supply for precluding the further entry of data into said camera.

20. A microfilm camera comprising means for simultaneously photographically recording a physical document and computer selected document identifying information displayed adjacent said physical document during the entry of data taken from said physical document into said computer terminal and while a computer terminal operator is reading said document in order to operate said computer terminal, and means for automatically operating said camera for making said photographic recording of both said physical document and said document-identifying information responsive to a predetermined step in the data entry sequence as it is being performed by said operator at said computer terminal.

* * * * *